United States Patent [19]

Hacker et al.

[11] Patent Number: 6,020,410
[45] Date of Patent: Feb. 1, 2000

[54] STABLE SOLUTION OF A SILSESQUIOXANE OR SILOXANE RESIN AND A SILICONE SOLVENT

[75] Inventors: Nigel P. Hacker, San Martin; Todd Krajewski, San Jose; Scott Lefferts, Sunnyvale; Gary Davis, Freemont, all of Calif.

[73] Assignee: AlliedSignal Inc., Morristown, N.J.

[21] Appl. No.: 08/955,802

[22] Filed: Oct. 22, 1997

Related U.S. Application Data

[60] Provisional application No. 60/029,235, Oct. 29, 1996.

[51] Int. Cl.$^7$ .................................................. C08K 5/54
[52] U.S. Cl. ........................... 524/267; 524/731; 427/387
[58] Field of Search ..................... 524/267, 731; 427/387

[56] References Cited

U.S. PATENT DOCUMENTS

| | | | |
|---|---|---|---|
| 3,615,272 | 10/1971 | Collins et al. | 23/366 |
| 4,756,977 | 7/1988 | Haluska et al. | 428/704 |
| 4,999,397 | 3/1991 | Weiss et al. | 524/755 |
| 5,010,159 | 4/1991 | Bank et al. | 528/23 |
| 5,145,723 | 9/1992 | Ballance et al. | 427/397.7 |
| 5,320,868 | 6/1994 | Ballance et al. | 427/228 |
| 5,370,904 | 12/1994 | Mine et al. | 427/126.2 |
| 5,380,567 | 1/1995 | Haluska | 427/578 |

FOREIGN PATENT DOCUMENTS

| | | |
|---|---|---|
| 0 479 452 | 4/1992 | European Pat. Off. . |
| 0 606 588 | 7/1994 | European Pat. Off. . |
| 0 616 001 | 9/1994 | European Pat. Off. . |
| 0 503 825 | 3/1996 | European Pat. Off. . |
| 0 791 567 | 8/1997 | European Pat. Off. . |
| 7-300560 | 11/1995 | Japan . |

*Primary Examiner*—Melvyn I. Marquis
*Attorney, Agent, or Firm*—Leslie A. Weiss

[57] ABSTRACT

Storage solutions of silsesquioxane and siloxane polymers are obtained by means of a silicon containing solvent composition. The solution has at least one polymer having a formula of $[(HSiO_{1.5})_xO_y]_n$, $(HSiO_{1.5})_n$, $[(HSiO_{1.5})_xO_y(RSiO_{1.5})_z]_n$, $[(HSiO_{1.5})_x(RSiO_{1.5})_y]_n$ or $[(HSiO_{1.5})_xO_y(RSiO_{1.5})_z]_n$ wherein x=about 6 to about 20, y=1 to about 3, z=about 6 to about 20, n=1 to about 4,000, and each R is independently H, $C_1$ to $C_8$ alkyl or $C_6$ to $C_{12}$ aryl. The solvent has the formula of $(CH_3)_3Si-O-[Si(CH_3)_2]_a-Si(CH_3)_3$, $(CH_3CH_2)Si-O-[Si(CH_3CH_2)_2]_a-SiCH_3CH_2)_3$, $R_3Si-O-[SiR'_2]_a-SiR_3$, $[O-Si(CH_3)_2]_b$, $[O-Si(CH_3CH_2)_2]_b$ or $[O-SiR'_2]_n$ wherein a=0–5, b=3–5, and each R' is independently H or $C_1$ to $C_8$ alkyl.

19 Claims, No Drawings

STABLE SOLUTION OF A SILSESQUIOXANE OR SILOXANE RESIN AND A SILICONE SOLVENT

This application claims benefit of Provisional Appln. 60/029,235 filed Oct. 29, 1996.

BACKGROUND OF THE INVENTION

1. Field of the Invention

The present invention pertains to solutions of silsesquioxane and siloxane resins. More particularly, the invention pertains to a solvent composition for forming improved stability coating compositions containing such resins.

2. Description of the Prior Art

It is known in the art that silsesquioxane and siloxane resins are useful in the electronic and semiconductor fields to coat silicon chips and other similar components. Such coatings protect the surface of substrates and form dielectric layers between electric conductors on integrated circuits. Such coatings can be used as protective coatings, interlevel dielectric layers, doped dielectric layers to produce transistor like devices, pigment loaded binder systems containing silicon to produce capacitor and capacitor like devices, multilayer devices, 3-D devices, silicon on insulator devices, coatings for superconductors, superlattice devices and the like. These resins include hydrogen silsesquioxane resins as well as silsesquioxane resins containing a significant portion of organic moieties.

The production of silsesquioxane resins is well known in the art. U.S. Pat. No. 3,615,272 teaches the production of a nearly fully condensed resin which may contain up to 100–300 ppm silanol by a process comprising hydrolyzing trichlorosilane in a benzenesulfonic acid hydrate hydrolysis medium and then washing the resultant resin with water or aqueous sulfuric acid. U.S. Pat. No. 5,010,159, teaches a method comprising hydrolyzing hydridosilanes in an arylsulfonic acid hydrate hydrolysis medium to form a resin which is then contacted with a neutralizing agent. Other hydridosiloxane resins, such as those disclosed in U.S. Pat. No. 4,999,397 are produced by hydrolyzing an alkoxy or acyloxy silane in an acidic, alcoholic hydrolysis medium. The use of hydrogen silsesquioxane resin in forming coatings on electronic devices is also well known in the art.

In order to effectively coat the resins onto a substrate, they are dissolved in a solvent to form coating compositions. Organic solvents are frequently used for this purpose. However, silsesquioxane resins (e.g. hydrogensilsesquioxane resin) dissolved in organic resins tend to have relatively short shelf lives. That is, the resins tend to undesirably increase in molecular weight during storage in a relatively short period of time. To date, it has been found that methylisobutyl ketone (MIBK) provides the longest shelf life of the commercially available solvents and therefore MIBK is widely used in the industry. Unfortunately, MIBK presents environmental and handling concerns and the industry has sought to reduce MIBK use. Prior to this invention, no successful alternatives to MIBK have been found. Other prior art solvents form coating composition with silsesquioxane resins which are unstable. U.S. Pat. No. 4,756,977 teaches a process of forming a coating on an electronic device comprising diluting hydrogen silsesquioxane resin in a solvent, applying the solution to the electronic device and heating the coated device to convert the resin to a ceramic. This patent lists toluene and n-heptane as exemplary solvents. Similarly, U.S. Pat. No. 5,320,868 teaches solvents which can be used for coating hydrogen silsesquioxane resin including alcohols such as ethyl or isopropyl, aromatic hydrocarbons such as benzene or toluene, alkanes such as n-heptane or dodecane, ketones, cyclic dimethylpolysiloxanes, esters or glycol ethers. This patent does not mention the solvents disclosed herein. U.S. Pat. No. 5,370,904 teaches solvents including MIBK and certain silicones which can be used for coating hydrogen silsesquioxane resin, however, there is no appreciation of the improvement in stability when silicone solvents are used as opposed to non-silicone solvents.

It would be desirable to produce improved coating compositions with silsesquioxane resins which are storage stable. It has now been found that stable solutions can be formed to deposit coatings which still have excellent coating quality. The solvent composition of this invention for coating silsesquioxane and siloxane resins provides shelf life properties that are equal to or better than MIBK and which is safer and more environmentally acceptable than MIBK. It has now been found that when silsesquioxane and siloxane resins are dissolved in solvents containing certain siloxane functional groups, the compositions exhibit good coating properties, have very good shelf life, and present fewer handling and environmental concerns than when MIBK is used in the solvent.

SUMMARY OF THE INVENTION

The invention provides a stable coating composition which comprises a solution of at least one polymer having a formula selected from the group consisting of $[(HSiO_{1.5})_xO_y]_n$, $(HSiO_{1.5})_n$, $[(HSiO_{1.5})_xO_y(RSiO_{1.5})_z]_n$, $[(HSiO_{1.5})_x(RSiO_{1.5})_y]_n$ and $[(HSiO_{1.5})_xO_y(RSiO_{1.5})_z]_n$ wherein x=about 6 to about 20, y=1 to about 3, z=about 6 to about 20, n=1 to about 4,000, and each R is independently H, $C_1$ to $C_8$ alkyl or $C_6$ to $C_{12}$ aryl; and at least one solvent selected from the group consisting of $(CH_3)_3Si-O-[Si(CH_3)_2]_a-Si(CH_3)_3$, $(CH_3CH_2)Si-O-[Si(CH_3CH_2)_2]_a-SiCH_3CH_2)_3$, $R_3Si-O-[SiR'_2]_a-SiR_3$, $[O-Si(CH_3)_2]_b$, $[O-Si(CH_3CH_2)_2]_b$ and $[O-SiR'_2]_n$ wherein a=0–5, b=3–5, and each R' is independently H or $C_1$ to $C_8$ alkyl.

The invention also provides a method of impeding an increase in molecular weight of a one polymer having a formula selected from the group consisting of $[(HSiO_{1.5})_xO_y]_n$, $(HSiO_{1.5})_n$, $[(HSiO_{1.5})_xO_y(RSiO_{1.5})_z]_n$, $[(HSiO_{1.5})_x(RSiO_{1.5})_y]_n$ and $[(HSiO_{1.5})_xO_y(RSiO_{1.5})_z]_n$ wherein x=about 6 to about 20, y=1 to about 3, z=about 6 to about 20, n=1 to about 4,000, and each R is independently H, $C_1$ to $C_8$ alkyl or $C_6$ to $C_{12}$ aryl which comprises forming a solution of the polymer and at least one solvent selected from the group consisting of $(CH_3)_3Si-O-[Si(CH_3)_2]_a-Si(CH_3)_3$, $(CH_3CH_2)Si-O-[Si(CH_3CH_2)_2]_a-SiCH_3CH_2)_3$, $R_3Si-O-[SiR'_2]_a-SiR_3$, $[O-Si(CH_3)_2]_b$, $[O-Si(CH_3CH_2)_2]_b$ and $[O-SiR'_2]_n$ wherein a=0–5, b=3–5, and each R' is independently H or $C_1$ to $C_8$ alkyl.

The invention further provides a method of forming a layer on a substrate which comprises forming a solution of at least one polymer having a formula selected from the group consisting of $[(HSiO_{1.5})_xO_y]_n$, $(HSiO_{1.5})_n$, $[(HSiO_{1.5})_xO_y(RSiO_{1.5})_z]_n$, $[(HSiO_{1.5})_x(RSiO_{1.5})_y]_n$ and $[(HSiO_{1.5})_xO_y(RSiO_{1.5})_z]_n$ wherein x=about 6 to about 20, y=1 to about 3, z=about 6 to about 20, n=1 to about 4,000, and each R is independently H, $C_1$ to $C_8$ alkyl or $C_6$ to $C_{12}$ aryl; and at least one solvent selected from the group consisting of $(CH_3)_3Si-O-[Si(CH_3)_2]_a-Si(CH_3)_3$, $(CH_3CH_2)Si-O-[Si(CH_3CH_2)_2]_a-SiCH_3CH_2)_3$, $R_3Si-O-[SiR'_2]_a-SiR_3$, $[O-Si(CH_3)_2]_b$, $[O-Si(CH_3CH_2)_2]_b$ and $[O-SiR'_2]_n$ wherein a=0–5, b=3–5, and each R' is independently H or $C_1$ to $C_8$ alkyl; coating the solution onto a substrate and drying the solution.

DETAILED DESCRIPTION OF THE PREFERRED EMBODIMENT

In the practice of the present invention, a composition is prepared which is broadly composed of a solution of at least one of the above polymers and at least one of the above solvents.

Polymers useful for the invention include hydrogensiloxanes which have the formula $[(HSiO_{1.5})_xO_y]_n$, hydrogensilsesquioxanes which have the formula $(HSiO_{1.5})_n$, and hydroorganosiloxanes which have the formulae $[(HSiO_{1.5})_xO_y (RSiO_{1.5})_z]_n$, $[(HSiO_{1.5})_x(RSiO_{1.5})_y]_n$ and $[(HSiO_{1.5})_xO_y (RSiO_{1.5})_z]_n$. In each of these polymer formulae, x=about 6 to about 20, y=1 to about 3, z=about 6 to about 20, n=1 to about 4,000, and each R is independently H, $C_1$ to $C_8$ alkyl or $C_6$ to $C_{12}$ aryl. The weight average molecular weight may range from about 1,000 to about 220,000. In the preferred embodiment n ranges from about 100 to about 800 yielding a molecular weight of from about 5,000 to about 45,000. More preferably, n ranges from about 250 to about 650 yielding a molecular weight of from about 14,000 to about 36,000.

Useful polymers within the context of this invention nonexclusively include hydrogensiloxane, hydrogensilsesquioxane, hydrogenmethylsiloxane, hydrogenethylsiloxane, hydrogenpropylsiloxane, hydrogenbutylsiloxane, hydrogentert-butylsiloxane, hydrogenphenylsiloxane, hydrogenmethylsilsesquioxane, hydrogenethylsilsesquioxane, hydrogenpropylsilsesquioxane, hydrogenbutylsilsesquioxane, hydrogentert-butylsilsesquioxane and hydrogenphenylsilsesquioxane. The hydroorganosiloxanes are preferred.

The polymer component is preferably present in an amount of from about 10% to about 30% by weight of the composition. A more preferred range is from about 15% to about 30% and most preferably from about 17% to about 25% by weight of the composition.

The composition then contains a solvent component comprising at least one solvent. Useful linear solvents have the formulae $(CH_3)_3Si$—O—$[Si(CH_3)_2]_a$—$Si(CH_3)_3$, $(CH_3CH_2)Si$—O—$[Si(CH_3CH_2)_2]_a$—$SiCH_3CH_2)_3$, and $R_3Si$—O—$[SiR'_2]_a$—$SiR_3$. Useful cyclic solvents have the formulae [O—$Si(CH_3)_2]_b$, [O—$Si(CH_3CH_2)_2]_b$ and [O—$SiR'_2]_n$ wherein a=0–5, b=3–5, and each R' is independently H or $C_1$ to $C_8$ alkyl.

Examples of linear solvents nonexclusively include decamethyltetrasiloxane, 1,3-dioctyltetramethyldisiloxane, octamethyltrisiloxane, pentamethyldisiloxane, hexamethyldisiloxane, 1,1,3,3,5,5-hexamethyltrisiloxane, 1,1,3,3-tetramethyldisiloxane, 1,3-bis-(trimethylsiloxy)-1,3-dimethylsiloxane, bis(trimethylsiloxy)ethylsilane, bis(trimethylsiloxy)methylsilane, decamethyltetrasiloxane, dodecamethylpentasiloxane, 1,1,1,3,3,5,5-heptamethyltrisiloxane, hexaethyldisiloxane, heptamethyltrisiloxane and 1,1,3,3-tetraisopropyldisiloxane.

Examples of cyclic solvents nonexclusively include decamethylcyclopentasiloxane, hexaethylcyclotrisiloxane, hexamethylcyclotrisiloxane, 1,3,5,7-tetramethylcyclotetrasiloxane, pentamethylcyclopentasiloxane, octamethylcyclotetrasiloxane, methylhydrocyclosiloxanes of the formula $(CH_3HSiO)_{3-5}$, 1,3,5,7,tetraethylcyclotetrasiloxane and 1,3,5,7,tetramethylcyclotetrasiloxane.

Preferred linear solvents are octamethyltrisiloxane and hexamethyldisiloxane and preferred cyclic solvents are decamethylcyclopentasiloxane and octamethylcyclotetrasiloxane. These have the formulae:

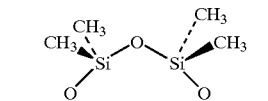
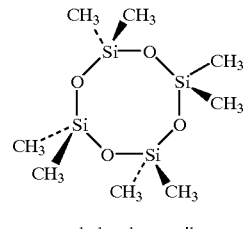

decamethylcyclopentasiloxane   octamethylcyclotetrasiloxane

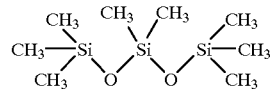
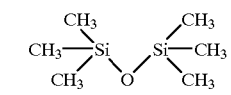

octamethyltrisiloxane   hexamethyldisiloxane

The solvent component is preferably present in the overall composition in an amount of from about 70% to about 90% by weight of the composition, more preferably from about 70% to about 85% and most preferably from about 75% to about 83% by weight of the composition.

It has been found that blends of the solvents of this invention are particularly preferred since by forming such blends one is able to fine tune the evaporation rate of the composition on a substrate. Low boiling point solvents tend to produce thicker films and are not as uniform as desired. High boiling point solvents tend to produce thinner films and a greater than desired amount of coating is removed during spin coating operations. Ideally those skilled in the art seek to produce a very smooth film at a desired target film thickness, for example about 4,000 angstroms. One particularly useful solvent blend comprises from about 5% to about 15% by weight of hexamethyldisiloxane (b.p. 100° C.), from about 10% to about 20% by weight of octamethyltrisiloxane (b.p. 152° C.) and from about 70% to about 80% by weight of octamethylcyclotetrasiloxane (b.p. 175° C.).

The overall composition may be used by coating it onto a substrate, such as a semiconductor substrate, particularly silicon wafers with subsequent drying and/or curing. The coating may be used as a planarizing layer or as an insulation between metal lines on the substrate. Drying may be conducted by heating at temperatures of from about 150° C. to about 350° C. for example, for at least one minute. Drying may be conducted at a sequentially increasing temperature, for example 1 minute at 150° C., followed by one minute at 250° C. and one minute at 350° C. Suitable drying temperatures and heating times may be easily determined by those skilled in the art. Thereafter the coating may optionally be cured, such as by heating at temperatures of from about 250° C. to about 800° C. until cured to convert the composition to a ceramic. Suitable curing temperatures and heating times may be easily determined by those skilled in the art.

The following non-limiting examples serve to illustrate the invention. Examples 1–4 demonstrate spin-coating, baking and curing using the siloxane solvents of this invention. Examples 5–7 show molecular weight growth in the siloxane solvents of this invention. Examples 8–10 show molecular weight growth in other solvents for comparison.

EXAMPLE 1

1368.8 g of a solvent blend (10% hexamethyldisiloxane, 15% octamethyltrisiloxane and 75% octamethylcyclotetrasiloxane) was combined with 300.1 g of hydridosiloxane polymer. Approximately 2 ml of the solution was coated on each of two bare 4" silicon wafers using an SVG spin coater. The spin cycle consisted of a 3 sec. delay, 3000 RPM spin for 20 sec. with an acceleration of 50,000 RPM/sec, then a deceleration of 50,000 RPM/sec. The wafer was then baked on three successive hotplates for one min. each, at 150° C., 180° C., and 300° C. respectively. Film thickness measured 3768 Å on a Nanospec AFT, corrected for the refractive index of 1.403 as measured on a Rudolph elipsometer. Thickness varied by 0.5% over 10 measurements on the two wafers. Thickness variations of about 3% or less are considered to be substantially uniform.

EXAMPLE 2

243.7 g of a solvent blend (10% hexamethyldisiloxane, 15% octamethyltrisiloxane and 75% octamethylcyclotetrasiloxane) was combined with 53.56 g of a hydridomethylsiloxane polymer. 2 ml of this solution was coated on each of two bare 4" silicon wafers using an SVG spin coater. The spin cycle consisted of a 3 sec. delay, 2000 RPM spin for 20 sec. with an acceleration of 50,000 RPM/sec, then a deceleration of 50,000 RPM/sec. The wafer was then baked on three successive hotplates for one min. each, at 150° C., 200° C., and 350° C. respectively. Film thickness averaged 3743 Å as measured on a Nanospec AFT, corrected for the average refractive index of 1.404 as measured on a Rudolph elipsometer. Thickness varied by 1.4% over 10 measurements on the two wafers. The wafers were then cured in a horizontal furnace under a nitrogen atmosphere at a flow rate of 14 L/min., using a ramp program starting at 300° C., ramping to 370° C. at 4° C./min., holding at 370° C. for 10 min, ramping to 380° C. at 1° C./min., holding at 380 C. for 60 min., then cooling down to 250° C. at ambient rate (about 1° C./min.) Thickness averaged 3990 Å as measured on a Nanospec AFT, corrected for the refractive index of 1.365 as measured on a Rudolph elipsometer. Thickness varied by 0.80% over 10 measurements on the two wafers and is considered to be very uniform.

EXAMPLE 3

266.4 g of a solvent blend (10% hexamethyldisiloxane, 15% octamethyltrisiloxane and 75% octamethylcyclotetrasiloxane) was combined with 58.1 g of a hydridomethyl siloxane polymer. Approximately 2 ml of the solution was coated on each of two bare 4" silicon wafers using an SVG spin coater. The spin cycle consisted of a 3 sec. delay, 3000 RPM spin for 20 sec. with an acceleration of 50,000 RPM/sec, then a deceleration of 50,000 RPM/sec. The wafer was then baked on three successive hotplates for one min. each, at 150° C., 200° C., and 350° C. respectively. Film thickness averaged 3005 Å as measured on a Nanospec AFT, corrected for the average refractive index of 1.4. Thickness varied by 1.9% over 10 measurements on the two wafers. The wafers were then cured in a horizontal furnace under a nitrogen atmosphere at a flow rate of 14 L/min., using a ramp program starting at 300° C., ramping to 380° C. at 4° C./min., holding at 380° C. for 5 min, ramping to 400° C. at 2° C./min., holding at 400° C. for 60 min., then cooling down to 300° C. at ambient rate (about 1° C./min.) Thickness averaged 3082 Å as measured on a Nanospec AFT, corrected for the refractive index of 1.36. Thickness varied by 1.07% over 10 measurements on the two wafers and is considered to be very uniform.

EXAMPLE 4

146.20 g of a solvent blend (10% hexamethyldisiloxane, 15% octamethyltrisiloxane and 75% octamethylcyclotetrasiloxane was combined with 32.10 g of a tert-butylhydridosiloxane polymer. 2 ml of the solution was coated on a bare silicon wafer using an SVG spin coater. The spin cycle consisted of a 3 sec. delay, 3000 RPM spin for 20 sec. with an acceleration of 50,000 RPM/sec, then a deceleration of 50,000 RPM/sec. Wafer was then baked on three successive hotplates for one min. each, at 150° C., 180° C., and 300° C. respectively. Film thickness measured 2652 Å on a Nanospec AFT. Refractive index could not be measured on a Rudolph elipsometer. Thickness varied by 0.23% over 5 measurements. Wafer was then cured at 380° C. for 1 hr in a horizontal furnace under a nitrogen atmosphere at a flow rate of 4 L/min. Thickness measured 2344 Å on a Nanospec AFT, corrected for the refractive index of 1.375 as measured on a Rudolph elipsometer. Thickness varied by 0.54% over 5 measurements and is considered to be very uniform.

EXAMPLE 5

1368.8 g of a solvent blend (10% hexamethyldisiloxane, 15% octamethyltrisiloxane and 75% octamethylcyclotetrasiloxane) was combined with 300.1 g of hydridosiloaxne polymer. The solution was filtered to 0.1 micron. The molecular weight of the solution was tested on a Waters 410 GPC using toluene as the flow medium, and calibrated with polystyrene standards. The original molecular weight was measured as 22709 atomic mass units (AMU), and after 15 days at room temperature the molecular weight measured 25060 AMU indicating an average growth rate of 157 AMU per day.

EXAMPLE 6

266.4 g of a solvent blend (10% hexamethyldisiloxane, 15% octamethyltrisiloxane and 75% octamethylcyclotetrasiloxane) was combined with 58.1 g of a hydridomethyl siloxane polymer. The molecular weight of the solution was tested on a Waters 410 GPC using toluene as the flow medium, and calibrated with polystyrene standards. The original molecular weight was measured as 22340 AMU, and after 18 days at room temperature the molecular weight measured 22351 AMU, indicating a very low average growth rate of 0.6 AMU per day.

EXAMPLE 7

251.6 g of a solvent blend (10% hexamethyldisiloxane, 15% octamethyltrisiloxane and 75% octamethylcyclotetrasiloxane was combined with 55.3 g of a hydridomethyl siloxane polymer. The molecular weight of the solution was tested on a Waters 410 GPC using toluene as the flow medium, and calibrated with polystyrene standards. The original molecular weight was measured as 30492 AMU, and after 105 days at room temperature the molecular weight measured 31466 AMU, indicating a low average growth rate of 9.3 AMU per day.

EXAMPLE 8 (COMPARATIVE)

25.7 g of MIBK was dried over 3 Å molecular sieves and was combined with 6.5 g of a hydridomethyl siloxane polymer. Solution was filtered to 0.2 micron. Molecular weight of the solution was tested on a HP GPC using THF as the flow medium, and calibrated with polystyrene standards. The original molecular weight was measured as 8317 AMU, and after 7 days at room temperature the molecular weight measured 9523 AMU, indicating an average growth rate of 172 AMU per day.

EXAMPLE 9 (COMPARATIVE)

6.61 g of heptane and 2.92 g of dodecane were dried over 3 Å molecular sieves and was combined with 2.10 g of a hydridomethyl siloxane polymer. The solution was filtered to 0.2 micron. The molecular weight of the solution was tested on a HP GPC using THF as the flow medium, and calibrated with polystyrene standards. The original molecular weight was measured as 18039 AMU, and after 23 days at room temperature the molecular weight measured 26143 AMU, indicating a high average growth rate of 352 AMU per day.

EXAMPLE 10 (COMPARATIVE)

6.61 g of heptane and 2.92 g of dodecane were dried over 3 Å molecular sieves and was combined with 2.10 g of a hydridomethyl siloxane polymer. The solution was filtered to 0.2 micron. The molecular weight of the solid was tested on a HP GPC using THF as the solvent and flow medium, and calibrated with polystyrene standards. The original molecular weight was measured as 15844 AMU, and after 23 days at room temperature the molecular weight measured 25566 AMU, indicating a high average growth rate of 422 AMU per day.

The following examples 11–14 demonstrate the improved shelf life of solvents made pursuant to the present invention, as compared to MIBK containing solvents.

EXAMPLE 11

A solution of 18% by weight of hydrogen silsesquioxane is prepared in the following solvents and stored in Teflon bottles. The molecular weight of the polymer is measured after 1 day and after 5 days. The molecular weight of the polymer has increased much less in decamethylcyclopentasiloxane and octamethylcyclotetrasiloxane than in MIBK.

|  | Day 1 | Day 5 | % Growth |
|---|---|---|---|
| decamethylcyclopentasiloxane | 20301 | 20403 | 0.5 |
| octamethylcyclotetrasiloxane | 20301 | 20857 | 2.7 |
| MIBK | 20674 | 26996 | 30.6 |

EXAMPLE 12

A solution of 18% by weight of hydrogen silsesquioxane is prepared in the following solvents and stored in Teflon bottles. The molecular weight of the polymer is measured after 1 day and after 19 days. The molecular weight of the polymer has increased much less in the indicated siloxane solvents than in MIBK.

|  | Day 1 | Day 19 | % Growth |
|---|---|---|---|
| hexamethyldisiloxane/decamethyl-cyclopentasiloxane (1:1) | 29387 | 35182 | 19.7 |
| hexamethyldisiloxane/decamethyl-cyclopentasiloxane (4:1) | 27758 | 36279 | 30.7 |
| hexamethyldisiloxane/octamethyl-cyclotetrasiloxane (1:1) | 28277 | 35472 | 25.4 |
| hexamethyldisiloxane | 27648 | 33950 | 22.8 |
| MIBK | 26958 | 62643 | 132.4 |

EXAMPLE 13

A solution of 18% by weight of hydrogen silsesquioxane is prepared in the following solvents and stored in high density polyethylene bottles. The molecular weight of the polymer is measured after 1 day and after 19 days. The molecular weight of the polymer has increased much less in the indicated siloxane solvents than in MIBK.

|  | Day 1 | Day 19 | % Growth |
|---|---|---|---|
| hexamethyldisiloxane/decamethyl-cyclopentasiloxane (1:1) | 28518 | 34237 | 20.1 |
| hexamethyldisiloxane/decamethyl-cyclopentasiloxane (4:1) | 28551 | 34033 | 19.2 |
| hexamethyldisiloxane/octamethyl-cyclotetrasiloxane (1:1) | 26952 | 34395 | 27.6 |
| hexamethyldisiloxane | 26448 | 35116 | 32.8 |
| MIBK | 31682 | 75956 | 139.7 |

EXAMPLE 14

A solution of 18% by weight of hydrogen silsesquioxane is prepared in the following solvents and stored in Teflon bottles. The molecular weight of the polymer is measured after 1 day and after 16 days. The molecular weight of the polymer has increased much less in the indicated siloxane solvents than in MIBK.

|  | Day 1 | Day 16 | % Growth |
|---|---|---|---|
| hexamethyldisiloxane/octamethyl-cyclotetrasiloxane (1:2) | 24994 | 27817 | 11.3 |
| octamethyltrisiloxane | 25042 | 27041 | 8.0 |
| octamethylcyclotetrasiloxane | 24672 | 27926 | 13.2 |
| MIBK | 26001 | 44888 | 72.6 |

EXAMPLE 15

This example illustrates some of the relevant coating properties of siloxane containing solvents. A solution of 18% by weight of hydrogen silsesquioxane is prepared in the following solvents, coated, baked and cured under the indicated conditions. The coating properties of hydrogen silsesquioxane in these solvents is excellent, with variation in film thickness only between 0.2–1.9%.

| Exper. # | % hexa-methyldi-siloxane | % octa-methylcyclo-tetrasiloxane | % octa-methyl-trisiloxane | % deca-methylcyclo-pentasiloxane | Baked Film Thickness | Uniformity |
|---|---|---|---|---|---|---|
| 1 |  |  |  | 100 | 1636 | 0.40% |
| 2 | 33 |  | 67 |  | 4214 | 1.90% |
| 3 |  |  | 100 |  | 3119 | 0.50% |
| 4 |  | 100 |  |  | 3392 | 0.30% |
| 5 |  | 60 | 20 | 20 | 3585 | 0.20% |

Spin Conditions - 3000 RPM for 20 s, accel = 50,000 RPM/s.
Bake conditions - Hot plate bakes of 150, 180, 300° C., 1 min. each at ambient (air)
Cure conditions - 400° C. for 1 hr. at 4.75 L/min.
Thicknesses are in angstroms.

From these examples it can be seen that the solvents of the present invention provide stable solutions of the polymers and exceptionally uniform coatings.

What is claimed is:

1. A stable coating composition which comprises a solution of at least one polymer having a formula selected from the group consisting of $[(HSiO_{1.5})_xO_y]_n$, $[(HSiO_{1.5})_x(RSiO_{1.5})_y]_n$ and $[(HSiO_{1.5})_xO_y(RSiO_{1.5})_z]_n$ wherein x=about 6 to about 20, y=1 to about 3, z=about 6 to about 20, n=1 to about 4,000, and each R is independently H, $C_1$ to $C_8$ alkyl or $C_6$ to $C_{12}$ aryl, and at least one solvent selected from the group consisting of $(CH_3)_3Si$—O—$[Si(CH_3)_2]_a$—$Si(CH_3)_3$, $(CH_3CH_2)_3Si$—O—$[Si(CH_3CH_2)_2]_a$—Si—$(CH_3CH_2)_3$, $R_3Si$—O—$[SiR'_2]_a$—$SiR_3$, $[O$—$Si(CH_3)_2]_b$, and $[O$—$Si(CH_3CH_2)_2]_b$, wherein a=0–5, b=3–5, and each R' is independently H or $C_1$ to $C_8$ alkyl.

2. The composition of claim 1 wherein n ranges from about 100 to about 800.

3. The composition of claim 1 wherein n ranges from about 250 to about 650.

4. The composition of claim 1 wherein the polymer has the formula $[(HSiO_{1.5})_xO_y]_n$.

5. The composition of claim 1 wherein the polymer has the formula $[(HSiO_{1.5})_xO_y(RSiO_{1.5})_z]_n$.

6. The composition of claim 1 wherein the polymer has the formula $[(HSiO_{1.5})_x(RSiO_{1.5})_y]_n$.

7. The composition of claim 1 wherein the polymer is selected from the group consisting of hydrogensiloxane, hydrogensilsesquioxane, hydrogenmethylsiloxane, hydrogenethylsiloxane, hydrogenpropylsiloxane, hydrogenbutylsiloxane, hydrogentert-butylsiloxane, hydrogenphenylsiloxane, hydrogenmethylsilsesquioxane, hydrogenethylsilsesquioxane, hydrogenpropylsilsesquioxane, hydrogenbutylsilsesquioxane, hydrogentert-butylsilsesquioxane and hydrogenphenylsilsesquioxane.

8. The composition of claim 1 wherein the solvent has the formula $(CH_3)_3Si$—O—$[Si(CH_3)_2]_a$—$Si(CH_3)_3$.

9. The composition of claim 1 wherein the solvent has the formula $(CH_3CH_2)Si$—O—$[Si(CH_3CH_2)_2]_a$—$SiCH_3CH_2)_3$.

10. The composition of claim 1 wherein the solvent has the formula $R_3Si$—O—$[SiR'_2]_a$—$SiR_3$.

11. The composition of claim 1 wherein the solvent has the formula $[O$—$Si(CH_3)_2]_b$.

12. The composition of claim 1 wherein the solvent has the formula $[O$—$Si(CH_3CH_2)_2]_b$.

13. The composition of claim 1 wherein the solvent comprises one or more components selected from the group consisting of decamethyltetrasiloxane, 1,3-dioctyltetramethyldisiloxane, octamethyltrisiloxane, pentamethyldisiloxane, hexamethyldisiloxane, 1,1,3,3,5,5-hexamethyltrisiloxane, 1,1,3,3-tetramethyldisiloxane, 1,3-bis-(trimethylsiloxy)-1,3-dimethylsiloxane, bis (trimethylsiloxy)ethylsilane, bis(trimethylsiloxy) methylsilane, decamethyltetrasiloxane, dodecamethylpentasiloxane, 1,1,1,3,3,5,5-heptamethyltrisiloxane, hexaethyldisiloxane, heptamethyltrisiloxane, 1,1,3,3-tetraisopropyldisiloxane, decamethylcyclopentasiloxane, hexaethylcyclotrisiloxane, hexamethylcyclotrisiloxane, 1,3,5,7-tetramethylcyclotetrasiloxane, pentamethylcyclopentasiloxane, octamethylcyclotetrasiloxane, methylhydrocyclosiloxanes of the formula $(CH_3HSiO)_{3-5}$, 1,3,5,7, tetraethylcyclotetrasiloxane and 1,3,5,7, tetramethylcyclotetrasiloxane.

14. The composition of claim 1 wherein the solvent comprises one or more components selected from the group consisting of decamethylcyclopentasiloxane, octamethylcyclotetrasiloxane, octamethyltrisiloxane and hexamethyldisiloxane.

15. The composition of claim 1 wherein the polymer is present in an amount of from about 10% to about 30% by weight of the composition and the solvent is present in an amount of from about 70% to about 90% by weight of the composition.

16. A method of impeding an increase in molecular weight of at least one polymer having a formula selected from the group consisting of $[(HSiO_{1.5})_xO_y]_n$, $[(HSiO_{1.5})_x(RSiO_{1.5})_y]_n$ and $[(HSiO_{1.5})_xO_y(RSiO_{1.5})_z]_n$ wherein x=about 6 to about 20, y=1 to about 3, z=about 6 to about 20, n=1 to about 4,000, and each R is independently H, $C_1$ to $C_8$ alkyl or $C_6$ to $C_{12}$ aryl, which comprises forming a solution of the polymer and at least one solvent selected from the group consisting of $(CH_3)_3Si$—O—$[Si(CH_3)_2]_a$—$Si(CH_3)_3$, $(CH_3CH_2)_3Si$—O—$[Si(CH_3CH_2)_2]_a$—Si—$(CH_3CH_2)_3$, $R_3Si$—O—$[SiR'_2]_a$—$SiR_3$, $[O$—$Si(CH_3)_2]_b$, and $[O$—$Si(CH_3CH_2)_2]_b$ wherein a=0–5, b=3–5, and each R' is independently H or $C_1$ to $C_8$ alkyl.

17. A method of forming a layer on a substrate which comprises forming a solution of at least one polymer having a formula selected from the group consisting of $[(HSiO_{1.5})_xO_y]_n$, $[(HSiO_{1.5})_x(RSiO_{1.5})_y]_n$ and $[(HSiO_{1.5})_xO_y(RSiO_{1.5})_z]_n$ wherein x=about 6 to about 20, y=1 to about 3, z=about 6 to about 20, n=1 to about 4,000, and each R is independently H, $C_1$ to $C_8$ alkyl or $C_6$ to $C_{12}$ aryl; and at least one solvent selected from the group consisting of $(CH_3)_3Si$—O—$[Si(CH_3)_2]_a$—$Si(CH_3)_3$, $(CH_3CH_2)_3Si$—O—$[Si(CH_3CH_2)_2]_a$—Si—$(CH_3CH_2)_3$, $R_3Si$—O—$[SiR'_2]_a$—$SiR_3$, $[O$—$Si(CH_3)_2]_b$, and $[O$—$Si(CH_3CH_2)_2]_b$ wherein a=0–5, b=3–5, and each R' is independently H or $C_1$ to $C_8$ alkyl; coating the solution onto a substrate and drying the solution.

18. The method of claim 17 wherein the substrate comprises a semiconductor.

19. The method of claim 17 comprising heating the solution on the substrate at a temperature which ranges from about 150° C. to about 800° C. for at least one minute.

* * * * *